(12) United States Patent
Ling

(10) Patent No.: US 11,614,153 B2
(45) Date of Patent: Mar. 28, 2023

(54) DOUBLE-FLEXSPLINE HARMONIC REDUCER WITH LIMITABLE DEFORMATION

(71) Applicant: Zilong Ling, Guangdong (CN)

(72) Inventor: Zilong Ling, Guangdong (CN)

(73) Assignee: AICI TECHNOLOGY (SHENZHEN) CO. LTD., Shenzhen (CN)

( * ) Notice: Subject to any disclaimer, the term of this patent is extended or adjusted under 35 U.S.C. 154(b) by 139 days.

(21) Appl. No.: 17/286,461

(22) PCT Filed: Dec. 7, 2019

(86) PCT No.: PCT/CN2019/123847
§ 371 (c)(1),
(2) Date: Apr. 17, 2021

(87) PCT Pub. No.: WO2020/119611
PCT Pub. Date: Jun. 18, 2020

(65) Prior Publication Data
US 2021/0348679 A1 Nov. 11, 2021

(30) Foreign Application Priority Data
Dec. 11, 2018 (CN) .......................... 201811512956.4

(51) Int. Cl.
*F16H 49/00* (2006.01)
*F16H 55/08* (2006.01)
(52) U.S. Cl.
CPC ....... *F16H 49/001* (2013.01); *F16H 55/0833* (2013.01); *F16H 2049/003* (2013.01)
(58) Field of Classification Search
CPC .................................................... F16H 49/001
(Continued)

(56) References Cited

U.S. PATENT DOCUMENTS 3,147,640 A * 9/1964 Walton .................. F16H 49/001
74/461
4,099,427 A * 7/1978 Fickelscher ............... F16H 1/32
475/180
(Continued)

FOREIGN PATENT DOCUMENTS

CN 106208543 A 12/2016
CN 206816783 U 12/2017
(Continued)

OTHER PUBLICATIONS

International Search Report of PCT/CN2019/123847.
Written Opinion of PCT/CN2019/123847.

*Primary Examiner* — Ha Dinh Ho
(74) *Attorney, Agent, or Firm* — Dragon Sun Law Firm, PC; Jinggao Li; Nathaniel Perkins

(57) ABSTRACT

The present application discloses a double-flexspline harmonic reducer, comprising a strong flexspline (3), a weak flexspline (2), a wave generator (1), and a deformation stopper (4) of the strong flexspline; the strong flexspline and the weak flexspline are coaxially fixed axially and radially, the strong flexspline and the weak flexspline are respectively provided with teeth that can engage with each other; the number of teeth of the strong flexspline and the weak flexspline are different; the wave generator is used to make the weak flexspline to undergo non-circular elastic deformation and partially engage with the strong flexspline; the contact part of the strong flexspline and the weak flexspline is subjected to the radial pressure of the weak flexspline to generate a non-circular elastic deformation, a flexible tubular wall of the strong flexspline has a toothless surface, and a limiting contact surface is processed on the toothless surface.

10 Claims, 16 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 4,625,582 A | * | 12/1986 | Kiryu | F16H 49/001 |
| | | | | 74/640 |
| 4,667,539 A | * | 5/1987 | Fickelscher | F16H 1/32 |
| | | | | 475/180 |
| 4,969,376 A | * | 11/1990 | Fickelscher | F16H 49/001 |
| | | | | 475/180 |
| 9,228,651 B2 | | 1/2016 | Waide | |
| 2005/0217420 A1 | | 10/2005 | Kobayashi et al. | |
| 2010/0024593 A1 | * | 2/2010 | Schmidt | F16H 25/06 |
| | | | | 74/640 |
| 2012/0270692 A1 | * | 10/2012 | Hoebel | H02K 7/116 |
| | | | | 475/167 |

FOREIGN PATENT DOCUMENTS

| | | |
|---|---|---|
| CN | 109356992 A | 2/2019 |
| CN | 209245180 U | 8/2019 |

* cited by examiner

DOUBLE-FLEXSPLINE HARMONIC REDUCER WITH LIMITABLE DEFORMATION

CROSS-REFERENCE TO RELATED APPLICATIONS

This Application is a national stage application of PCT/CN2019/123847. This application claims priorities from PCT Application No. PCT/CN2019/123847, filed Dec. 7, 2019, and from the Chinese patent application 201811512956.4 filed Dec. 11, 2018, the content of which are incorporated herein in the entirety by reference.

TECHNICAL FIELD

The present invention relates to the field of reducer, and in particular to a double-flexspline harmonic reducer with limitable deformation.

BACKGROUND OF THE PRESENT INVENTION

Harmonic gear transmission was invented by the American inventor C. W. Musser in 1955, which is a new type of transmission that uses the elastic deformation of flexible working members for movement or power transmission. The harmonic gear transmission breaks through the rigid component mechanism to realize mechanical transmission, and uses a flexible component to realize mechanical transmission, thereby obtaining a series of special functions that are difficult to achieve by other transmissions. Since the deformation process of the intermediate flexible component is basically a symmetrical harmonic, it is named. Except that the former Soviet Union called this type of transmission as wave transmission or flexible wheel transmission, the countries, such as United States, Britain, Germany, Japan, all called it "harmonic transmission".

The principle of harmonic gear transmission deceleration refers to the use of the relative movement of the flexspline, rigid wheel and wave generator, mainly the controllable elastic deformation of the flexspline, to realize movement and power transmission. The elliptical cam in the wave generator rotates in the flexspline to deform the flexspline. When the flexspline gear teeth at both ends of the long shaft of the elliptical cam of the wave generator and the rigid wheel gear teeth come into engagement, the flexspline gear teeth at both ends of the short shaft disengage from the rigid wheel gear teeth. The teeth between the long shaft and the short shaft of the wave generator, in different sections along the circumference of the flexspline and the rigid wheel, are in a semi-engaging state that gradually enter engaging, which is called engaging-in; and the teeth in a semi-engaging state that gradually exits engaging, called engaging-out. When the wave generator rotates continuously, the flexspline continuously deforms, so that the flexspline gear teeth and the rigid wheel gear teeth continuously change their original working states in four motions, namely, engaging-in, engagement, engaging-out and disengagement, resulting in a staggered tooth motion, which realizes the motion transmission from the active wave generator to the flexspline.

Composition of existing harmonic gear transmission device: ①rigid wheel, namely, rigid internal gear, generally 2 teeth more than flexspline, usually fixed on the casing; ②flexspline, the flexspline is a thin cup-shaped metal elastic component with gears on the outer ring of the opening, which deforms with the rotation of the wave generator, and it is usually connected with the output shaft; ③wave generator, which consists of an elliptical cam and a flexible bearing, usually connected with the input shaft. The inner ring of the flexible bearing is fixed on the cam, and the outer ring can be elastically deformed into an ellipse through balls.

SUMMARY OF THE PRESENT INVENTION

Technical Problems

However, the return difference of the existing harmonic reducer depends on the engagement tightness between the elliptical long shaft teeth and the rigid gear teeth after the elliptical deformation of the flexspline under the action of the wave generator. If the engagement is not tight, the return difference will be larger; and if too tight, it will be unable to assemble or difficult to rotate. Whether the flexspline and the rigid wheel can accurately engage depends on the production accuracy of the harmonic reducer. The higher accuracy requirements of the harmonic reducer increase the production cost and limit some of the cheaper materials and processing techniques. Meanwhile, the flexspline, rigid wheel and wave generator will be worn during operation, which will also decrease the engagement tightness of the flexspline and the rigid wheel, resulting in large return difference of the reducer, thereby shortening the precision life of the reducer.

Technical Solution

To overcome the deficiencies of the prior art, the present application provides a double-flexspline harmonic reducer with limitable deformation.

The technical scheme of the present application is as follows.

A double-flexspline harmonic reducer with limitable deformation, the double-flexspline harmonic reducer comprises a strong flexspline, a weak flexspline, a wave generator, and a deformation stopper of the strong flexspline; the strong flexspline and the weak flexspline are coaxially fixed axially and radially, the strong flexspline and the weak flexspline are respectively provided with teeth that can engage with each other; the number of teeth of the strong flexspline and the weak flexspline are different; the wave generator is used to make the weak flexspline to undergo non-circular elastic deformation and partially engage with the strong flexspline; the contact part of the strong flexspline and the weak flexspline is subjected to the radial pressure of the weak flexspline to generate a non-circular elastic deformation, a flexible tubular wall of the strong flexspline has a toothless surface, and a limiting contact surface is processed on the toothless surface, and the deformation stopper of the strong flexspline is relatively fixed with the strong flexspline, the deformation stopper of the strong flexspline is processed with an annular limiting surface, and the limiting contact surface, located at the non-circular elastic deformation region where the strong flexspline is subjected to the radial pressure of the weak flexspline, is contacted with the annular limiting surface, and the deformation of the strong flexspline is limited due to the contact between the strong flexspline after deformation the deformation stopper. The double-flexspline harmonic reducer of the present invention is to replace the rigid wheel of the existing harmonic reducer with the strong flexspline that is more rigid than the existing harmonic reducer flexspline. Therefore, one of the distinguishing features of the strong flexspline that is different from the existing rigid wheel is: the strong flexspline has a flexible thin wall similar to the flexspline of the existing harmonic reducer, which means that the strong flexspline includes a thin wall that can be elastically deformed between the ring gear structure that can be elastically deformed and the connecting flange structure that cannot be elastically deformed. Such thin wall structure that facilitates the non-circular elastic deformation of the surface of the ring gear structure usually adopts thin-walled tubular structure; the other distinguishing feature of the present invention is that after non-circular elastic deformation of the weak flexspline under the action of the wave generator, the reference radius of the tooth farthest from the axis of the reducer is larger than that of the circular ring gear of the strong flexspline before assembly; the weak flexspline undergoes non-circular elastic deformation under the action of the wave generator, and the strong flexspline undergoes non-circular elastic deformation under the radial pressure of the teeth of the engagement part of the weak flexspline after non-circular deformation. The weak flexspline always keeps part of the teeth continuously engaged in and out of the teeth of the strong flexspline along with the rotation direction of the wave generator. Due to the strong flexspline and the weak flexspline have different teeth number, the wave generator rotates to drive the strong flexspline and the weak flexspline to rotate relative to each other, so that the effect of decelerating and increasing torque can be achieved. A shaft hole or flange for inputting the power source is provided on the wave generator, and the strong flexspline and the weak flexspline are respectively equipped with fixed flange and output flange; the double-flexspline harmonic reducer also has the reversible output characteristics as the existing harmonic reducer; when application, most of the wave generators use an elliptical cam and a rolling bearing being arranged on the outer ring of the cam; the elliptical cam is a two-head cam that can cause two teeth of the weak flexspline being engaged with the strong flexspline. The difference in the number of teeth between the strong flexspline and the weak flexspline should be an integer multiple of the number of the cam heads of the wave generator. Theoretically, a single-head cam or a cam with more than three heads can be applied to make the weak flexspline and the strong flexspline engage at one or more places, and the use of cams with different numbers of heads corresponds to the number of teeth and tooth shapes of the strong flexspline and the weak flexspline. The tooth shape of the strong flexspline and weak flexspline can be cycloidal teeth, involute teeth, triangular teeth, trapezoidal teeth and circular cycloidal teeth, etc. Since the strong flexspline has a certain amount of deformation, that is, has a certain range of tooth surface engagement pressure, the engaging degree can be improved, which can facilitate the use of smaller tooth heights so as to reduce the elastic deformation of the weak flexspline and thereby reduce material fatigue. Furthermore, the smaller tooth height also more conducive to the miniaturization of the reducer. The purpose of using the double-flexspline is to allow the strong flexspline to have a small or slight non-circular elastic deformation with the weak flexspline when the harmonic reducer is running, this can not only increase the tolerance of the harmonic reducer to tolerances of elements, but also improve the anti-wear ability of the harmonic reducer to prolong the accuracy life. Therefore, the present invention allows the use of cheaper materials and processing techniques to produce the harmonic reducer with better accuracy, thereby greatly reducing the costs of the harmonic reducer. The double-flexspline harmonic reducer uses a stopper with an annular limiting surface to limit the deformation of the strong flexspline, that is, to limit the maximum value of the elliptical long axis after the strong flexspline is deformed. The deformation stopper of the strong flexspline is relatively fixed with the strong flexspline, and the deformation stopper is fixed at the adjusted installation position coaxial with the strong flexspline; the flexible tubular wall of the strong flexspline has an inner surface and outer surface, if the inner surface has teeth, the toothless surface refers to the outer surface of the tubular wall; if the outer surface has teeth that engage with the weak flexspline, the toothless surface refers to the inner surface of the tubular wall. In order to reduce the contact pressure of the limiting contact surface, the limiting contact surface on the strong flexspline and the surface of the deformation stopper contacting the strong flexspline are processed into the surfaces that coincide with each other when in contact, such as chamfered surfaces with approximate angles or rounded surfaces with approximate fillet radius. The tooth profile of the strong flexspline and weak flexspline can be involute tooth profile or trapezoidal tooth profile, etc. Similar to most tooth profile gear transmissions, keeping the tooth surface in contact with the force-bearing surface is the basic design principle. It is necessary for the present invention to maintain that the contact place of the teeth of the weak flexspline and the strong flexspline to tolerate the stress rather than other parts such as the tooth tip.

The annular limiting surface on the deformation stopper of the strong flexspline is an annular limiting surface with a gradually changing diameter. The annular limiting surface with a gradually changing diameter can realize different deformation limiting values by changing the axial position of the deformation stopper relative to the strong flexspline. This is because the elliptic long axis of the limiting contact surface after the strong flexspline is deformed cannot be larger than the diameter of the limiting contact surface of the deformation stopper. Therefore, the deformation limiting value of the strong flexspline can be changed by changing the diameter of the annular limiting surface of the strong flexspline. The commonly used annular limiting surface with a gradually changing diameter is a chamfered surface or fillet surface.

The diameter of the deformation stopper is different with that of the annular limiting surface of the strong flexspline by adjusting axial position of the deformation stopper relative to the strong flexspline, so that the adjustment of the deformation limiting value of the strong flexspline can be achieved. That is to say, by adjusting the axial position of the deformation stopper of the strong flexspline, the deformation limiting value of the strong flexspline can be adjusted. In this way, a mechanism that can adjust the deformation amount of the strong flexspline is proposed.

The deformation stopper of the strong flexspline is axially fixed to the strong flexspline directly through threads or indirectly through other elements of the reducer, and the deformation stopper and the strong flexspline realize axial position adjustment through relative rotation by the threads. By connecting the deformation stopper and the strong flexspline via threads or the deformation stopper and any elements that are relatively fixed to the strong flexspline via threads, and then rotating the deformation stopper, the adjustment of the axial position between the deformation stopper and the strong flexspline can be realized. Normally, the axis of the thread is coaxial with the strong flexspline; since the surface of the strong flexspline is not suitable for processing threads, a connecting element being processed with threads is required to be fixed with the strong flexspline, the threads of the connecting element is connected to the deformation stopper, and the connecting element may be directly fixed with the flange of the strong flexspline, or it may be fixed on the same bearing outer ring or on the same housing with the flange of the strong flexspline. The main bearing elements of the double-flexspline harmonic reducer can be processed with threads matching with the deformation stopper, so that the deformation stopper can be directly in threaded connection with the bearing elements which is fixed on the strong flexspline.

The fixing of the deformation stopper and the strong flexspline via threads further includes a thread-locking mechanism, the thread-locking mechanism is a top thread or a spline. In the prior art, there are a large number of thread-locking mechanism adopt top threads for holding threads and the surfaces of the workpieces, that is, the top thread is screwed on one of the two elements that are screwed to each other and pressed on the other one. There are also many thread-locking mechanisms using spline fixing, such as elastic stop washers, or using detachable spline washers by assembling and disassembling them to achieve locking fixation. It is not a preferred solution to use a disposable locking mechanism or an irreversible locking mechanism such as glue in the present invention.

A gear is provided on the deformation stopper of the strong flexspline, an external element may push the gear via other gears or worm so as to rotate the deformation stopper, and the external element may further lock the gear on the deformation stopper by adopting a non-rotating gear or worm so as to realize the locking of the fixed position of the deformation stopper along the axial direction of the strong flexspline relative to the strong flexspline. Wherein, the external element is not a part of the double-flexspline harmonic reducer, but refers to all the input elements having rotation or locking forces that can form the transmission pair with the gear on the deformation stopper. Further, the gear can be coaxial with the threads on the deformation stopper, the external element can be a gear that forms a gear transmission pair with the gear on the deformation stopper. Of course, when the gear or worm, acting as an external element, rotates, it can drive the deformation stopper tightening or loosening the thread fixed along the axial position of the strong flexspline, so that the adjustment of the fixed position of the deformation stopper along the axial direction of the strong flexspline can be achieved. In a similar way, when the gear or worm, acting as an external element, is fixed and does not rotate, it can lock the deformation stopper, that is, lock the fixed position of the deformation stopper along the axial direction of the strong flexspline.

The double-flexspline harmonic reducer further comprises an elastic element used for applying axial force to the deformation stopper, and the deformation stopper can move axially under the force of the elastic element. The elastic element can be springs or rubber pads, and the elastic element is installed in a compressed manner, so that the expansion force of the elastic element can axially push the deformation stopper to move towards a smaller radius of the contact area between the strong flexspline and the deformation stopper. When the deformation of the strong flexspline is reduced due to tooth surface wear or other reasons, the deformation stopper of the strong flexspline will move axially under the force of the elastic element; and the angle of the limiting contact surface of the strong flexspline and the axis of the strong flexspline should be less than 20 degrees, preferred to be less than 10 degrees, so that the axial component of the contact pressure between the strong flexspline and the deformation stopper is as small as possible, so as to minimize or avoid axial movement caused by the deformation stopper compressing the elastic element.

The deformation stopper of the strong flexspline can be processed into a flexspline protective housing or a part of the flexspline protective housing, so that the present invention maintains the current deformation upper limit value of the strong flexspline, but also protects the strong flexspline from interference caused by the installation of external elements.

The double-flexspline harmonic reducer further comprises a connecting element which is relatively fixed to the strong flexspline, and the deformation stopper of the strong flexspline is fixedly connected to the connecting element to realize the relative fixing between the connecting element and the strong flexspline. The connecting element is usually provided with a flange, and the flange of the connecting element and the flange of the strong flexspline are provided with bolt holes corresponding to the positions, which can be fixed to each other by bolts or fixed to the bearing or a housing by bolts, so that the relative fixing between the connecting element and the strong flexspline.

The double-flexspline harmonic reducer further comprises a gear or a worm, the gear or the worm and the gear processed on the deformation stopper form a gear transmission pair or a worm helical gear transmission pair, and the rotation axis of the gear/worm is relatively fixed to the strong flexspline. The gear/worm can be used as a kit together with the double-flexspline harmonic reducer. A structure for fixing the rotation axis of the gear/worm can be processed on the reducer, or a structure for fixing the rotation axis of the gear/worm can be processed on the housing of the reducer; the structure for fixing the rotation axis of the gear/worm is usually a bearing seat embedded with sliding or rolling bearings.

The strong flexspline of the double-flexspline harmonic reducer comprises a thin-walled structure that can be elastically deformed between the ring gear structure and the flange-connecting structure. The strong flexspline has a flexible thin wall which is similar to the flexspline of the existing harmonic reducer, that is, the strong flexspline includes a thin-walled structure that can be elastically deformed between the ring gear structure that can be elastically deformed and the flange-connecting structure that cannot be elastically deformed. Normally, a structure that facilitate non-circular elastic deformation of the ring gear structure adopts the thin-walled structure.

After the weak flexspline of the double-flexspline harmonic reducer undergoes the non-circular deformation under the action of the wave generator, the reference radius of the tooth of the weak flexspline farthest from the axis of the reducer is larger than that of the circular ring gear of the strong flexspline before assembly. This size difference between the weak flexspline and the strong flexspline guarantees the strong flexspline will produce a certain amount of elastic deformation after assembly, and this size difference is the deformation of the strong flexspline, the strong flexspline can only achieve the beneficial effect of the present invention under the basic premise of maintaining a certain amount of elastic deformation. This size difference is established on the location of weak flexspline inside and the strong flexspline outside, wherein the weak flexspline is equipped with an external ring gear and the strong flexspline is equipped with an internal ring gear, the wave generator acts on the inner wall of the weak flexspline.

The reference radius of the circular ring gear of the strong flexspline before assembly is larger than the reference radius of the tooth farthest from the axis of the reducer after the weak flexspline undergoes the non-circular deformation under the action of the wave generator. Theoretically, the double-flexspline harmonic reducer also may be arranged as follows: the weak flexspline is equipped with an internal ring gear at outside and the strong flexspline is equipped with an external ring gear at inside, the wave generator acts on the outer wall of the weak flexspline, and the weak flexspline pushes the strong flexspline inward. This structure requires that the reference radius of the circular ring gear of the strong flexspline before assembly is larger than the reference radius of the tooth farthest from the axis of the reducer after the weak flexspline undergoes the non-circular deformation under the action of the wave generator. Normally, it is recommended that the this size difference is at least 0.05 mm or more; in some cases, the size difference is more than 0.1 mm or 1 mm, and this size difference is the deformation of the strong flexspline. The deformation of the strong flexspline is related to the radius, material and processing accuracy of the strong flexspline. The larger the radius of the strong flexspline, the greater the deformation of the strong flexspline theoretically; the softer the material, the greater the deformation of the strong flexspline theoretically; the lower the processing accuracy, the greater the deformation of the strong flexspline theoretically. If an elliptical wave generator is adopted, the aforementioned deformation is the difference between the radius of the elliptical long axis and the radius of the elliptical minor axis after the deformation of the strong flexspline.

The double-flexspline harmonic reducer further comprises a main bearing, the strong flexspline and the weak flexspline are coaxially and axially fixed and radially fixed through the main bearing of the reducer, thus withstanding the axial moment, radial moment and overturning moment. The main bearing usually adopts a cross roller bearing or a double-row angular contact bearing, and can also adopt a pair of angular contact bearings or a pair of tapered roller bearings which are installed separately; and can be any bearing or bearing combination that can bear the axial moment, radial moment and overturning moment in the specific reducer structure. Furthermore, the total or part of the inner ring and outer ring of the main bearing can be directly processed on the strong flexspline and the weak flexspline, respectively, and can also be fixed on the strong flexspline and the weak flexspline via bolts, respectively; the fixed flange and output flange of the reducer can be processed on the strong flexspline and the weak flexspline, respectively, or can be processed on the inner ring and outer ring of the main bearing, respectively. In some special cases, the main bearing is in the form of sliding bearing, and the total or part of the inner ring and outer ring of the sliding bearing can be directly processed on the strong flexspline and the weak flexspline, respectively.

The double-flexspline harmonic reducer further comprises a positioning bearing, which is used for axially fixing radially and fixing the wave generator with the strong flexspline or the weak flexspline. Since there is no rigid wheel of the existing harmonic reducer, it is better to fix the axis of the wave generator so as to coaxial with the strong flexspline or the weak flexspline, thereby effectively reducing the impact on service life of motor and transmission efficiency of the reducer when the wave generator is connected to the motor with a slight uncoaxiality. The above-mentioned positioning bearing is not the non-circular bearing included in the wave generator of the existing harmonic reducer, but an additional circular bearing. If in the actual application, the driving shaft of the wave generator, such as the motor shaft, and the main bearing of the reducer have good coaxial and radial fixation, the positioning bearing is not needed; at this time, the wave generator is fixed radially and coaxially with the strong flexspline and the weak flexspline through the input driving shaft.

After the weak flexspline of the double-flexspline harmonic reducer undergoes the non-circular deformation under the action of the wave generator, the reference radius of the tooth of the weak flexspline farthest from the axis of the reducer is preferably larger than that of the circular ring gear of the strong flexspline before assembly by more than 0.2 mm.

The above-mentioned size difference is the deformation of the strong flexspline after assembly, the deformation of the strong flexspline is related to the radius, material and processing accuracy of the strong flexspline. The larger the radius of the strong flexspline, the greater the deformation of the strong flexspline theoretically; the softer the material, the greater the deformation of the strong flexspline theoretically; the lower the processing accuracy, the greater the deformation of the strong flexspline theoretically. If an elliptical wave generator is adopted, the aforementioned deformation is the difference between the radius of the elliptical long axis and the radius of the elliptical minor axis after the deformation of the strong flexspline.

The wall thickness of the strong flexspline is greater than 1.2 times the wall thickness of the weak flexspline and less than 4 times the wall thickness of the weak flexspline. The wall thickness of the strong flexspline or the weak flexspline refers to the wall thickness of the tubular part of the flexspline that is flexible and non-circular. The above limitation mainly based on the consideration that the strong flexspline and the weak flexspline usually use materials with similar or same modulus; if the materials of the strong flexspline and the weak flexspline have a large difference in elastic modulus, the above-mentioned wall thickness should be converted according to the difference in material elastic modulus.

The strong flexspline is a tubular elastic element with inner or outer flange. The flange is processed with part of the inner ring or outer ring of the main bearing of the reducer, or is processed with bolt holes on the flange so as to be fixed with the inner or outer ring of the main bearing of the reducer by bolts. The inner flange type is also called as a cup-shape structure.

The weak flexspline is a thin-walled tubular elastic element with inner or outer flange. The flange is processed with part of the inner ring or outer ring of the main bearing of the reducer, or is processed with bolt holes on the flange so as to be fixed with the inner or outer ring of the main bearing of the reducer by bolts. The inner flange type is also called as a cup-shape structure.

The existing harmonic reducers are normally have the structure of flexspline to be inside and the rigid wheel outside, and the flexspline is equipped with external teeth and the rigid wheel is equipped with internal teeth. But theoretically, it is feasible for the flexspline to be outside and the rigid wheel to be inside, and the flexspline is equipped with internal teeth and the rigid wheel is equipped with external teeth, so that the inner ring of the non-circular bearing of the wave generator can push the flexspline inward to engage with the rigid wheel. This structure is more favorable for the hollow structure of the harmonic reducer. In order to achieve better hollowing, the rotation force of the wave generator may comes from hollow outer rotor motor or from the gear or synchronous belt drive of the outer ring of the wave generator. In a similar manner, the double-flexspline harmonic reducer normally has the structure of strong flexspline to be outside and the weak flexspline to be inside, and the weak flexspline is equipped with external teeth, and the strong flexspline is equipped with internal teeth; alternatively, the double-flexspline harmonic reducer can have the structure of strong flexspline to be inside and the weak flexspline to be outside, and the strong flexspline is equipped with external teeth, and the weak flexspline is equipped with internal teeth; the shape of the weak flexspline can be a tubular shape with an outer flange, and the strong flexspline can be a tubular shape with an inner flange, and the wave generator is a hollow shape, so that the inner ring of the non-circular bearing of the wave generator can push the weak flexspline inward to generate a non-circular deformation, and the weak flexspline can further push the strong flexspline to generate a slight non-circular deformation; at this time, the rotation force of the wave generator may comes from hollow outer rotor motor or from the gear or synchronous belt drive of the outer ring of the wave generator. According to the description of this paragraph, the deformation stopper is located in the strong flexspline, and the deformation stopper no longer limits the maximum value of the long axis of the elliptical deformation of the strong flexspline, but the minimum value of the minor axis.

The double-flexspline harmonic reducer further comprises a flexspline protective housing, the flexspline protective housing is fixed with the inner ring or outer ring of the main bearing. Both the strong flexspline and the weak flexspline are flexible wheels and can be referred to as flexsplines. Since the outside of the reducer is not a rigid wheel but a flexspline, it is important to protect the outer flexspline of the reducer. It is necessary to ensure that the outer flexspline is not damaged during transportation and installation, but also to provide an enough space for the deformation of the outer flexspline so as to effectively protect the outer flexspline. The element, which is fixed with the strong flexspline and is in threaded connection with the deformation stopper, can be a part of the flexspline protective housing, but also be a part of the adjustment mechanism of the deformation stopper; and the element fixed with the strong flexspline and the deformation stopper act as the function of the flexspline protective housing. Meanwhile, the flexspline protective housing can be used as a coaxial connecting element between the main bearing of the reducer and the positioning bearing of the wave generator, and the positioning bearing is coaxially fixed with the main bearing via the flexspline protective housing.

The strong flexspline or the weak flexspline is made of plastic material injection molding or plastic material injection molding followed by a small amount of post-machining. The precision of the injection molding process is lower than that of precision metal processing, and the plastic parts have the shortcomings of water absorption and thermal deformation. If the existing harmonic reducer is processed by the injection molding process, it is difficult to achieve high-efficiency transmission with minimal return difference. The reducer of the present invention can realize precise harmonic reduction transmission if the tolerance of the injection molding process is less than the preset elastic deformation of the strong flexspline. POM and nylon are both potential materials for flexspline injection molding, such as PA66, PA6, PA601 and other nylon materials are very suitable for direct injection molding or molding followed by a small amount of post-machining. With the development of polymer injection molding materials, PEEK and other new generation polymer materials have better mechanical properties, as long as the hardness, wear resistance, toughness and fatigue resistance meet the requirements, polymer injection molding materials can be used for molding parts of the flexsplines and the deformation stopper, which can greatly reduce the cost and the weight of the reducer.

The weak flexspline and the strong flexspline are directly injection molded into elements including part of the inner ring and the outer ring of the main bearing, respectively. Due to the convenience of injection molding and considering the structure simplification and cost reduction, part of the inner ring or outer ring of the main bearing of the present invention are directly integrally injected on the weak flexspline and the strong flexspline; of course, the processing process can include injection molding followed by a small amount of post-machining.

The ball rolling groove of the wave generator is directly processed on the weak flexspline. When using plastic material to mold the weak flexspline, the wave generator can also be moulded. The balls of the bearing are filled into the wave generator and filled between the pre-processed inner ring and outer ring of the main bearing on the weak flexspline during assembly. It is more conducive to simplify the structure and reduce the cost when the full balls are filled into the bearing to form a full ball bearing.

The teeth of the double-flexspline harmonic reducer can be processed by laser marking or etching. The existing harmonic reducer is inconvenient to use small teeth due to the limitation of the tolerance, but due to the good error tolerance, the double-flexspline harmonic reducer of the present invention can use small teeth, so that the harmonic reducer can be designed such that the weak flexspline can be operated with only a small non-circular deformation, which can effectively improve the service life of the weak flexspline and reduce heat generation and improve the transmission efficiency. Therefore, laser marking or etching can be adopted to process the teeth of the strong flexspline and the weak flexspline so as to improve the processing efficiency and reduce the processing cost.

Although the above-mentioned strong flexspline and weak flexspline are different in strength, they all belong to flexspline. Similar like the wave generators and bearings, the flexspline is familiar to those in the field of harmonic reducers and transmission technology. The detailed technical indicators, processing techniques and common materials of above-mentioned parts will not be explained in detail in this description; for the common structure of the double-flexspline harmonic reducer of the present invention, the present invention will be further described below in detail with the specific embodiments for several typical structures. It is believed that those skilled in the art understand that the present invention aims to provide a harmonic reducer that replacing the rigid wheel in the existing harmonic reducer with a flexspline with a strong elastic modulus, and the flexspline can be adjusted to limit the maximum deformation, and those skilled in the art can fully understand that the present invention can be applied to all existing harmonic reducers.

The double-flexspline harmonic reducer has a significant advantage of more tolerant of machining tolerances, and can use parts with lower tolerance requirements to achieve high-precision, small return difference or even zero return difference; meanwhile, the tolerance of the parts is equivalent to the tolerance of the wear of the parts, and the wear of the parts will not affect the precision of the reducer within a certain range. It can also restore the precision of the load-bearing torque by further adjusting the deformation stopper of the strong flexspline, which can effectively increase the service life of the reducer; since the requirements for the machining tolerances of the parts are lowered, there are more choices of materials and processing techniques, which means that cheaper materials and processing techniques can be used to realize the manufacture of precision harmonic reducers, and the cost with same precision is reduced. For example, the strong tolerance to wear can reduce or omit the heat treatment process for the teeth of the weak flexspline, because the heat treatment of the teeth will reduce the anti-fatigue life of the weak flexspline; the double-flexspline harmonic reducer of the present invention is facilitate to use teeth with smaller tooth height, and the teeth with smaller tooth height is beneficial to reduce the elastic deformation of the weak flexspline so as to reduce material fatigue, and the teeth with smaller tooth height is also more conducive to the miniaturization of the reducer.

In which:

| 1: wave generator | 2: weak flexspline |
| 3: strong flexspline | 4: deformation stopper |
| 5: main bearing | 6: elastic part |

DETAILED DESCRIPTION OF THE PRESENT INVENTION

The present invention will be further described below in detail in combination with the specific embodiments and drawings.

Figure 1:
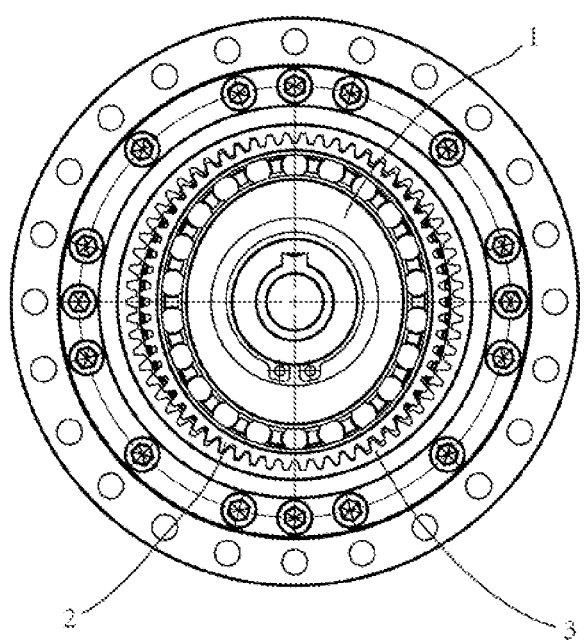
FIG. 1 is a schematic diagram of the double-flexspline harmonic reducer of the present invention according to embodiment 1.
Figure 2:
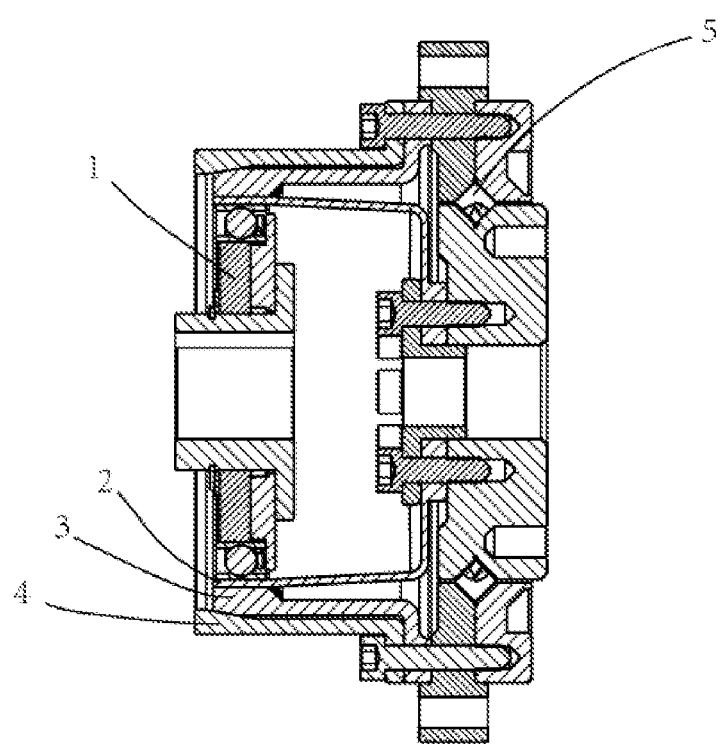
FIG. 2 is a sectional view of the double-flexspline harmonic reducer of the present invention according to embodiment 1.
Figure 3:
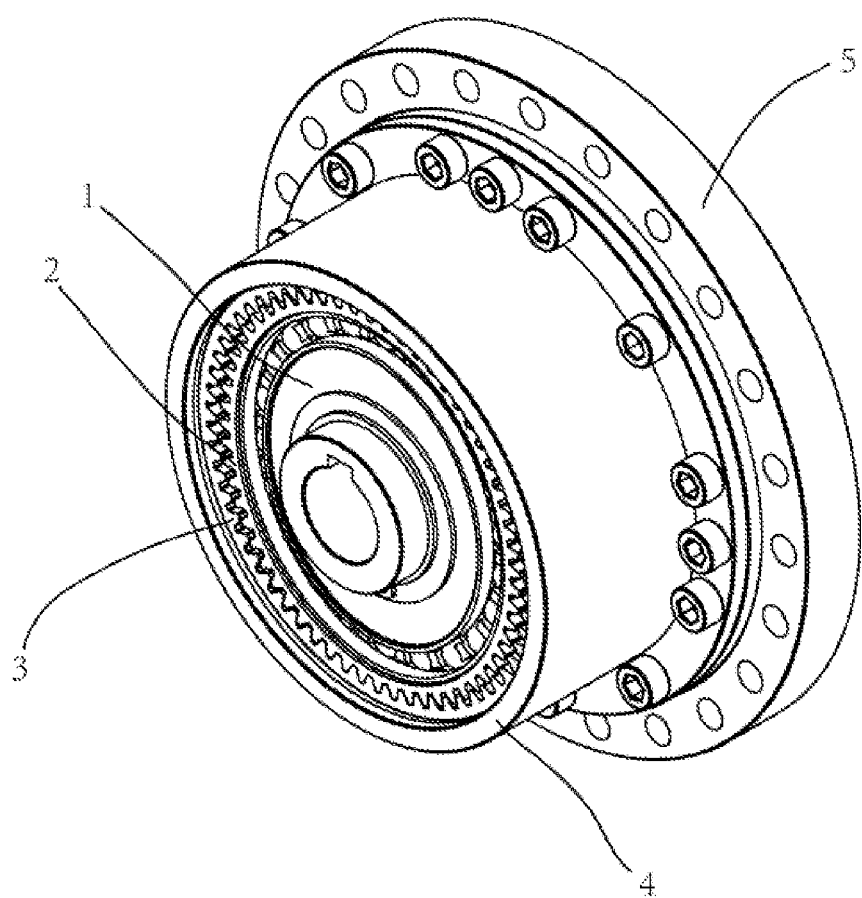
FIG. 3 is a stereogram of the double-flexspline harmonic reducer of the present invention according to embodiment 1.
Figure 4:
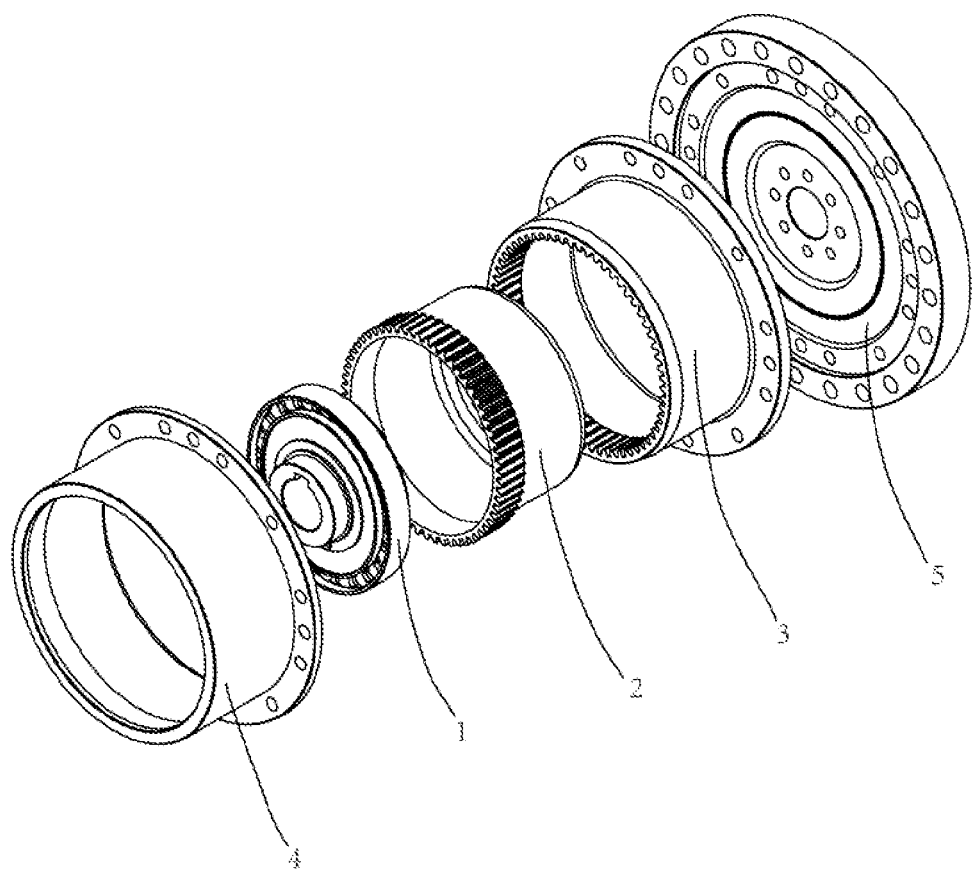
FIG. 4 is an exploded view of the parts of the double-flexspline harmonic reducer of the present invention according to embodiment 1.

Embodiment 1: as shown in FIGS. 1-4, a double-flexspline harmonic reducer comprises a strong flexspline, a weak flexspline, a wave generator, and a deformation stopper of the strong flexspline and a main bearing; the main bearing is a cross roller bearing, the strong flexspline and the weak flexspline are arranged with a flange, respectively; the strong flexspline and the weak flexspline are fixed with the inner ring and outer ring of the main bearing via bolts, respectively; and the strong flexspline and the weak flexspline are all processed by using the existing processing technology and are made of commonly used steel for the flexsplines. The strong flexspline and the weak flexspline are respectively provided with teeth that can engage with each other; the weak flexspline is equipped with external teeth, and the strong flexspline is equipped with internal teeth, and the teeth is involute teeth; the shape of the weak flexspline is a thin-walled cup shape like most of the flexspline in the existing harmonic reducer, and the strong flexspline has an outer flange tubular shape, and the wall thickness of the strong flexspline is greater than 2.5 times the wall thickness of the weak flexspline; the number of teeth of the strong flexspline is 2 more than that of the weak flexspline; the wave generator uses an elliptical cam and a rolling bearing being arranged on the outer ring of the cam like the existing harmonic reducer; a shaft hole for inputting the power source is provided on the wave generator; and the wave generator is equipped in the weak flexspline so that the weak flexspline undergoes non-circular elastic deformation and engages with part of the strong flexspline; after the weak flexspline of the double-flexspline harmonic reducer undergoes the non-circular deformation under the action of the wave generator, the reference radius of the tooth of the both ends of the elliptical long axis is larger than the reference radius of the teeth of the strong flexspline 0.1 mm, the contact part of the strong flexspline and the weak flexspline is subjected to the radial pressure of the weak flexspline to generate a non-circular elastic deformation; the deformation stopper is made of steel by machining; the deformation stopper is provided with a flange, and the flange is provided with bolt holes corresponding to the bolt holes on the strong flexspline, so that the flange of the deformation stopper and the flange of the strong flexspline are fixed to the outer ring of a same bearing by bolts; the lower edge of the outer wall of the strong flexspline is provided with a chamfered surface with an angle of 10 degrees, the inner wall of the deformation stopper is provided with a chamfered surface with an angle of 10 degrees; when the strong flexspline and the deformation stopper are fixed, the radial distance between the two chamfered surface is 0.1 mm. When the weak flexspline and the wave generator are assembled with the strong flexspline, the strong flexspline undergoes elliptical deformation, and the radial distance between the two chamfered surfaces of the elliptical long axis with an angle of 10 degrees and the chamfered surface of the deformation stopper with an angle of 10 degrees approaches 0. The weak flexspline always keeps part of the teeth continuously engaged in and out of the teeth of the strong flexspline along with the rotation direction of the wave generator, thus the wave generator rotating to drive the strong flexspline and the weak flexspline to rotate relative to each other, so as to achieve decelerating and increasing the torque. The strong flexspline shown in the figures has small deformation, which is not easy to visually see the elliptical deformation of the strong flexspline, so please understand the fact that the strong flexspline has deformation according to the description; the parts of the reducer, such as wave generator, bearing, are multi-entity parts, and the reference signs in the figures refer to any part of the entity contained in the reference signs; some connecting bolts and pads are hidden in the exploded view.

Figure 5:
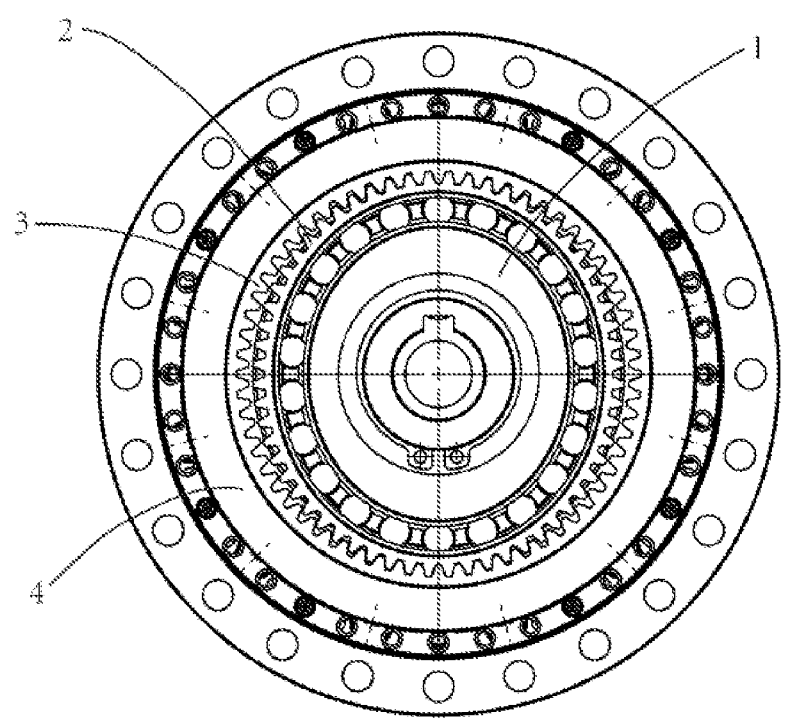
FIG. 5 is a schematic diagram of the double-flexspline harmonic reducer of the present invention according to embodiment 2.
Figure 6:
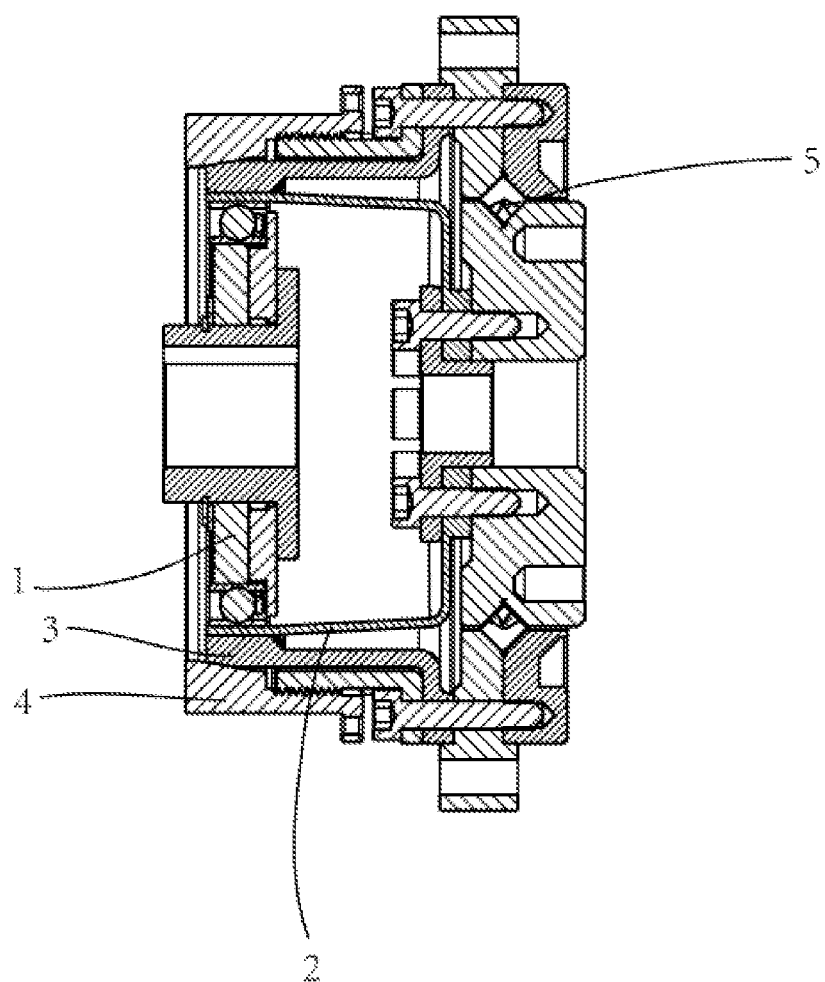
FIG. 6 is a sectional view of the double-flexspline harmonic reducer of the present invention according to embodiment 2.
Figure 7:
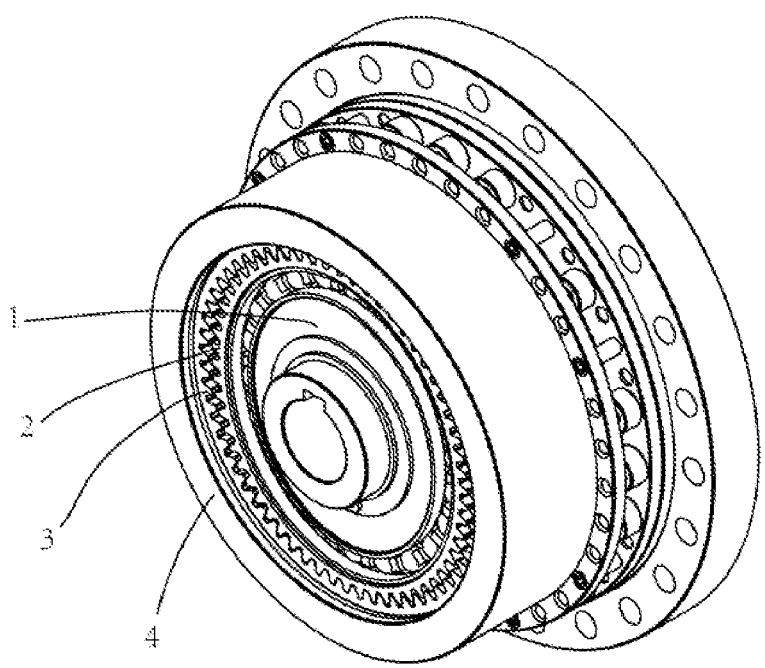
FIG. 7 is a stereogram of the double-flexspline harmonic reducer of the present invention according to embodiment 2.
Figure 8:
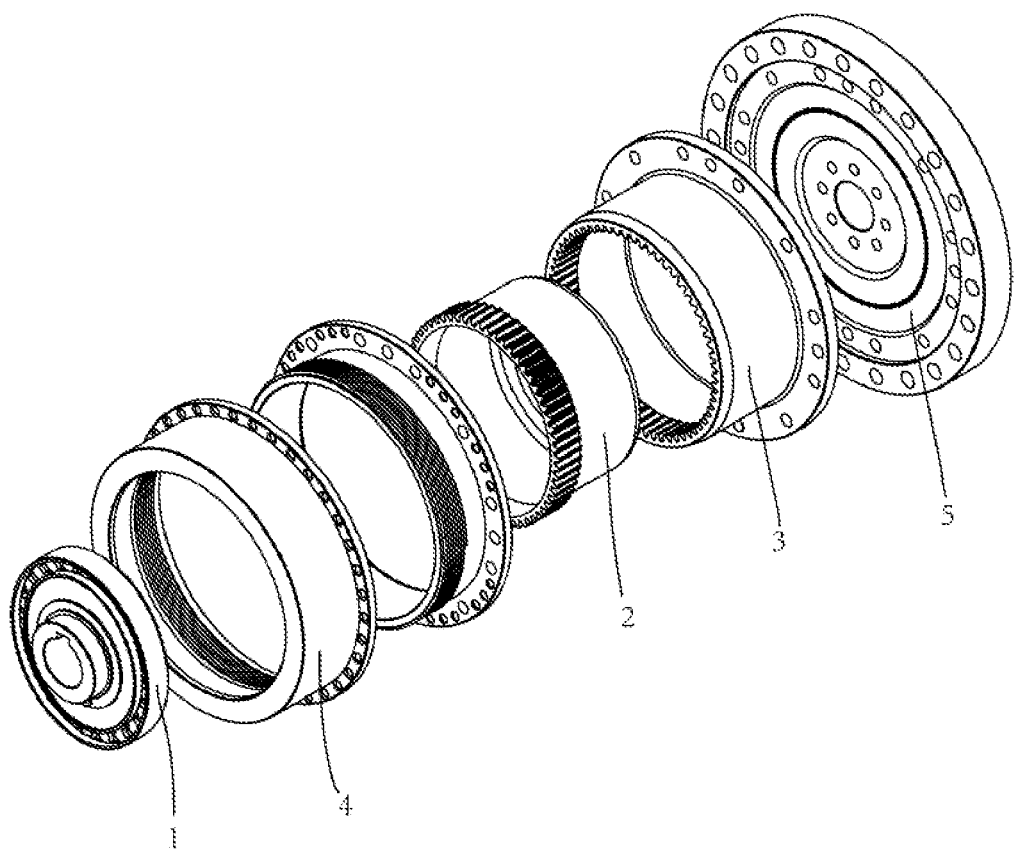
FIG. 8 is an exploded view of the parts of the double-flexspline harmonic reducer of the present invention according to embodiment 2.

Embodiment 2: as shown in FIGS. 5-8, a double-flexspline harmonic reducer comprises a strong flexspline, a weak flexspline, a wave generator, and a deformation stopper of the strong flexspline and a main bearing; the main bearing is a cross roller bearing, the strong flexspline and the weak flexspline are arranged with a flange, respectively; the strong flexspline and the weak flexspline are fixed with the inner ring and outer ring of the main bearing via bolts, respectively; and the strong flexspline and the weak flexspline are all processed by using the existing processing technology and are made of commonly used steel for the flexsplines. The strong flexspline and the weak flexspline are respectively provided with teeth that can engage with each other; the weak flexspline is equipped with external teeth, and the strong flexspline is equipped with internal teeth, and the teeth is involute teeth; the shape of the weak flexspline is a thin-walled cup shape like most of the flexspline in the existing harmonic reducer, and the strong flexspline has an outer flange tubular shape, and the wall thickness of the strong flexspline is greater than 2.5 times the wall thickness of the weak flexspline; the number of teeth of the strong flexspline is 2 more than that of the weak flexspline; the wave generator uses an elliptical cam and a rolling bearing being arranged on the outer ring of the cam like the existing harmonic reducer; a shaft hole for inputting the power source is provided on the wave generator; and the wave generator is equipped in the weak flexspline so that the weak flexspline undergoes non-circular elastic deformation and engages with part of the strong flexspline; after the weak flexspline of the double-flexspline harmonic reducer undergoes the non-circular deformation under the action of the wave generator, the reference radius of the tooth of the elliptical long axis is larger than the reference radius of the teeth of the strong flexspline 0.1 mm, the contact part of the strong flexspline and the weak flexspline is subjected to the radial pressure of the weak flexspline to generate a non-circular elastic deformation; the deformation stopper is made of steel by machining; the deformation stopper is provided with an internal threads, and the harmonic reducer also comprises a connecting element provided with a flange and an external threads; the connecting element is also made of metal and processed by machining, the deformation stopper is in threaded connection with the connecting element via threads; the connecting element is provided with flange, and the flange is provided with bolt holes corresponding to the bolt holes on the strong flexspline, so that the flange of the connecting element and the flange of the strong flexspline are fixed to the outer ring of a same bearing by bolts; the deformation stopper is further provided with holes for top threads, by screwing the top thread into the bolts, the thread-locking mechanism between the deformation stopper and the connecting element can be achieved. The lower edge of the outer wall of the strong flexspline is provided with a chamfered surface with an angle of 10 degrees, the inner wall of the deformation stopper is provided with a chamfered surface with an angle of 10 degrees; when the strong flexspline and the deformation stopper are fixed, the radial distance between the two chamfered surface is 0.1 mm. When the weak flexspline and the wave generator are assembled with the strong flexspline, the strong flexspline undergoes elliptical deformation, and the radial distance between the two chamfered surfaces of the elliptical long axis with an angle of 10 degrees and the chamfered surface of the deformation stopper with an angle of 10 degrees approaches 0. The weak flexspline always keeps part of the teeth continuously engaged in and out of the teeth of the strong flexspline along with the rotation direction of the wave generator, thus the wave generator rotating to drive the strong flexspline and the weak flexspline to rotate relative to each other, so as to achieve decelerating and increasing the torque. The strong flexspline shown in the figures has small deformation, which is not easy to visually see the elliptical deformation of the strong flexspline, so please understand the fact that the strong flexspline has deformation according to the description; the parts of the reducer, such as wave generator, bearing, are multi-entity parts, and the reference signs in the figures refer to any part of the entity contained in the reference signs; some connecting bolts and pads are hidden in the exploded view.

Figure 9:
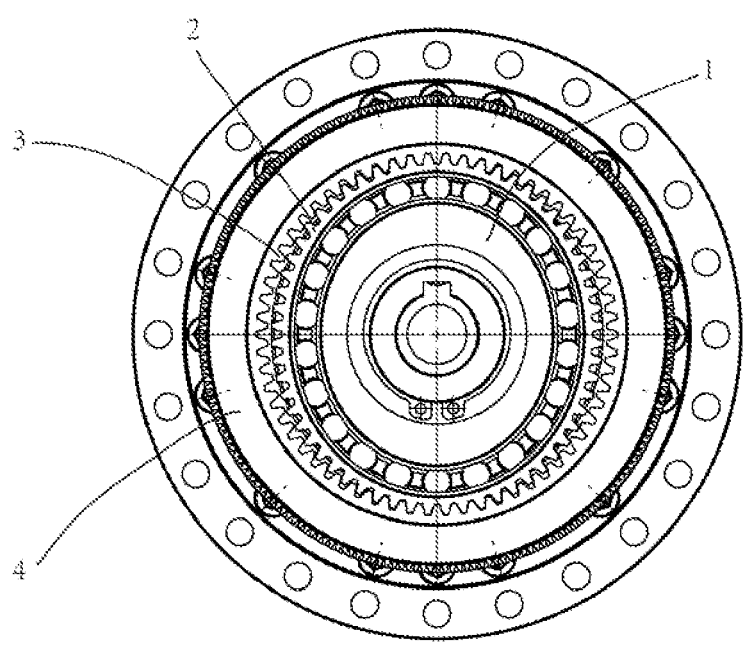
FIG. 9 is a schematic diagram of the double-flexspline harmonic reducer of the present invention according to embodiment 3.
Figure 10:
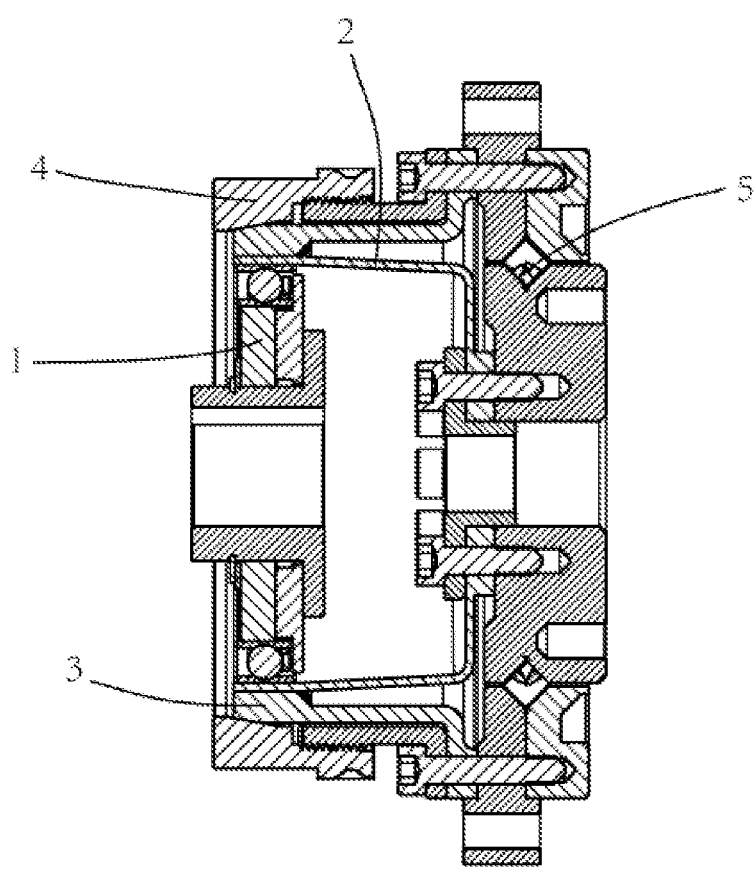
FIG. 10 is a sectional view of the double-flexspline harmonic reducer of the present invention according to embodiment 3.
Figure 11:
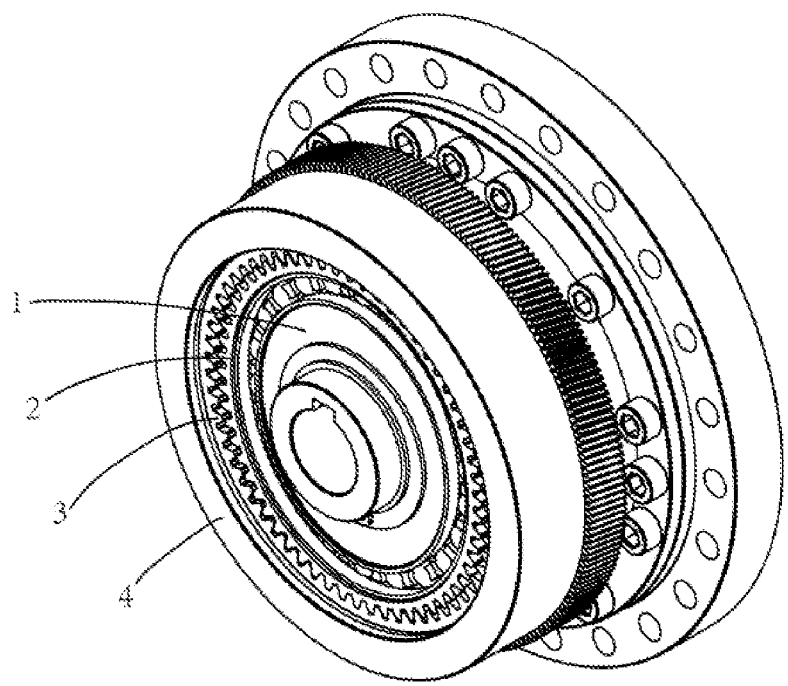
FIG. 11 is a stereogram of the double-flexspline harmonic reducer of the present invention according to embodiment 3.
Figure 12:
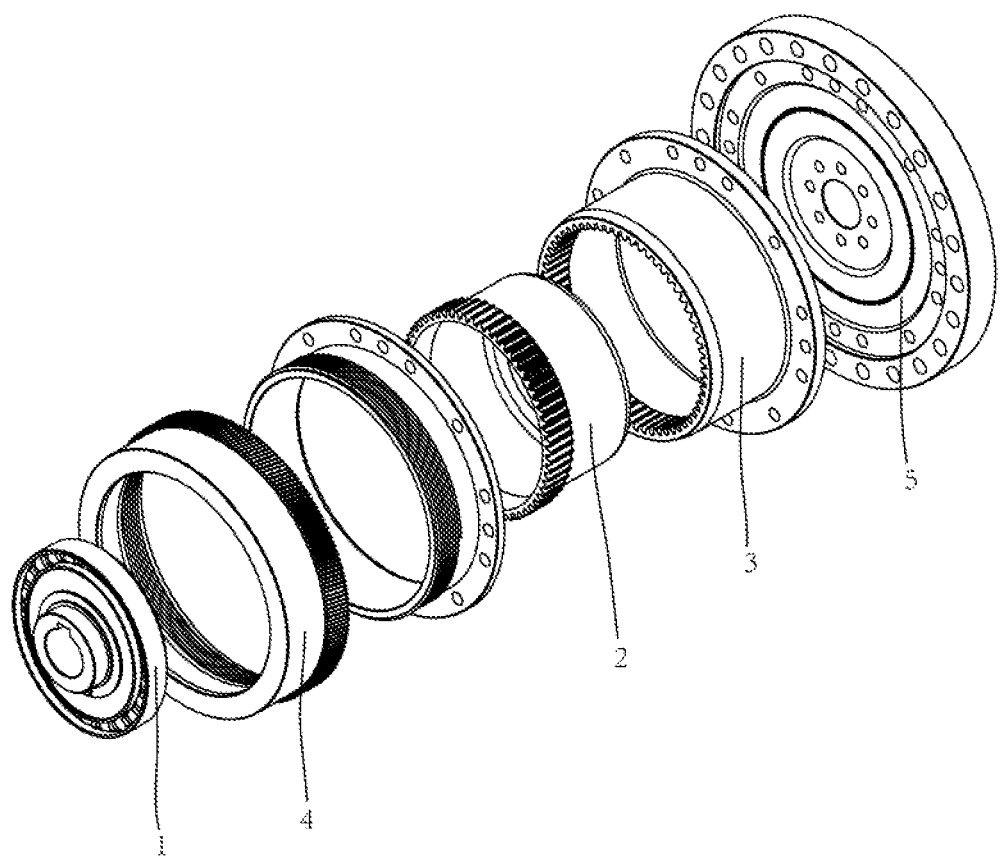
FIG. 12 is an exploded view of the parts of the double-flexspline harmonic reducer of the present invention according to embodiment 3.

Embodiment 3: as shown in FIGS. 9-12, a double-flexspline harmonic reducer comprises a strong flexspline, a weak flexspline, a wave generator, and a deformation stopper of the strong flexspline and a main bearing; the main bearing is a cross roller bearing, the strong flexspline and the weak flexspline are arranged with a flange, respectively; the strong flexspline and the weak flexspline are fixed with the inner ring and outer ring of the main bearing via bolts, respectively; and the strong flexspline and the weak flexspline are all processed by using the existing processing technology and are made of commonly used steel for the flexsplines. The strong flexspline and the weak flexspline are respectively provided with teeth that can engage with each other; the weak flexspline is equipped with external teeth, and the strong flexspline is equipped with internal teeth, and the teeth is involute teeth; the shape of the weak flexspline is a thin-walled cup shape like most of the flexspline in the existing harmonic reducer, and the strong flexspline has an outer flange tubular shape, and the wall thickness of the strong flexspline is greater than 2.5 times the wall thickness of the weak flexspline; the number of teeth of the strong flexspline is 2 more than that of the weak flexspline; the wave generator uses an elliptical cam and a rolling bearing being arranged on the outer ring of the cam like the existing harmonic reducer; a shaft hole for inputting the power source is provided on the wave generator; and the wave generator is equipped in the weak flexspline so that the weak flexspline undergoes non-circular elastic deformation and engages with part of the strong flexspline; after the weak flexspline of the double-flexspline harmonic reducer undergoes the non-circular deformation under the action of the wave generator, the reference radius of the tooth of the elliptical long axis is larger than the reference radius of the teeth of the strong flexspline 0.1 mm, the contact part of the strong flexspline and the weak flexspline is subjected to the radial pressure of the weak flexspline to generate a non-circular elastic deformation; the deformation stopper is made of steel by machining; the deformation stopper is provided with an internal threads, and the harmonic reducer also comprises a connecting element provided with a flange and an external threads; the connecting element is also made of metal and processed by machining, the deformation stopper is in threaded connection with the connecting element via threads; the connecting element is provided with flange, and the flange is provided with bolt holes corresponding to the bolt holes on the strong flexspline, so that the flange of the connecting element and the flange of the strong flexspline are fixed to the outer ring of a same bearing by bolts; an external gear is provided in the deformation stopper, the external gear is an input structure for the rotation adjustment of the deformation stopper, but also is an input structure for locking the deformation stopper acting as a locking mechanism. The lower edge of the outer wall of the strong flexspline is provided with a chamfered surface with an angle of 10 degrees, the inner wall of the deformation stopper is provided with a chamfered surface with an angle of 10 degrees; when the strong flexspline and the deformation stopper are fixed, the radial distance between the two chamfered surface is 0.1 mm. When the weak flexspline and the wave generator are assembled with the strong flexspline, the strong flexspline undergoes elliptical deformation, and the radial distance between the two chamfered surfaces of the elliptical long axis with an angle of 10 degrees and the chamfered surface of the deformation stopper with an angle of 10 degrees approaches 0. The weak flexspline always keeps part of the teeth continuously engaged in and out of the teeth of the strong flexspline along with the rotation direction of the wave generator, thus the wave generator rotating to drive the strong flexspline and the weak flexspline to rotate relative to each other, so as to achieve decelerating and increasing the torque. The strong flexspline shown in the figures has small deformation, which is not easy to visually see the elliptical deformation of the strong flexspline, so please understand the fact that the strong flexspline has deformation according to the description; the parts of the reducer, such as wave generator, bearing, are multi-entity parts, and the reference signs in the figures refer to any part of the entity contained in the reference signs; some connecting bolts and pads are hidden in the exploded view.

Figure 13:
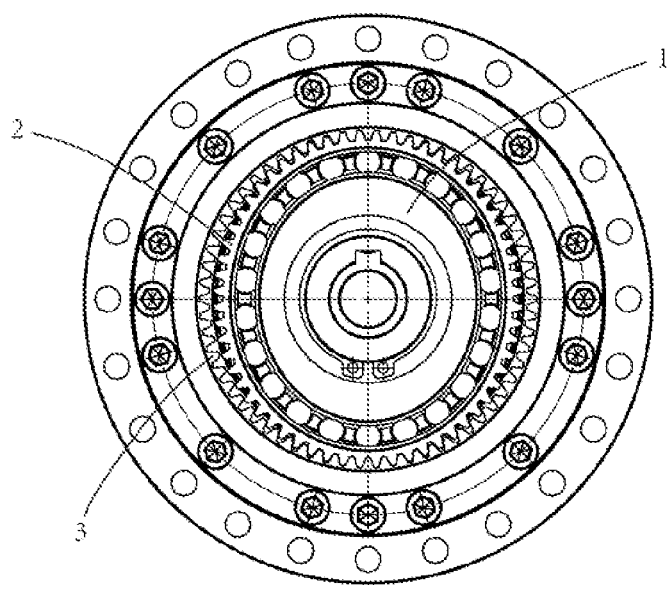
FIG. 13 is a schematic diagram of the double-flexspline harmonic reducer of the present invention according to embodiment 4.
Figure 14:
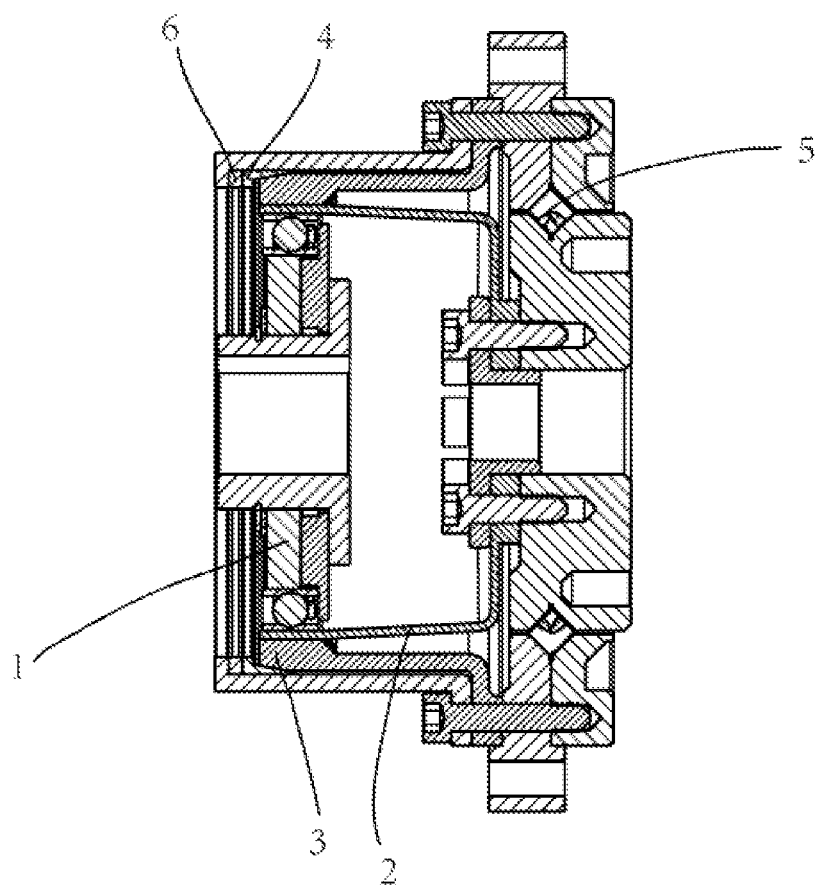
FIG. 14 is a sectional view of the double-flexspline harmonic reducer of the present invention according to embodiment 4.
Figure 15:
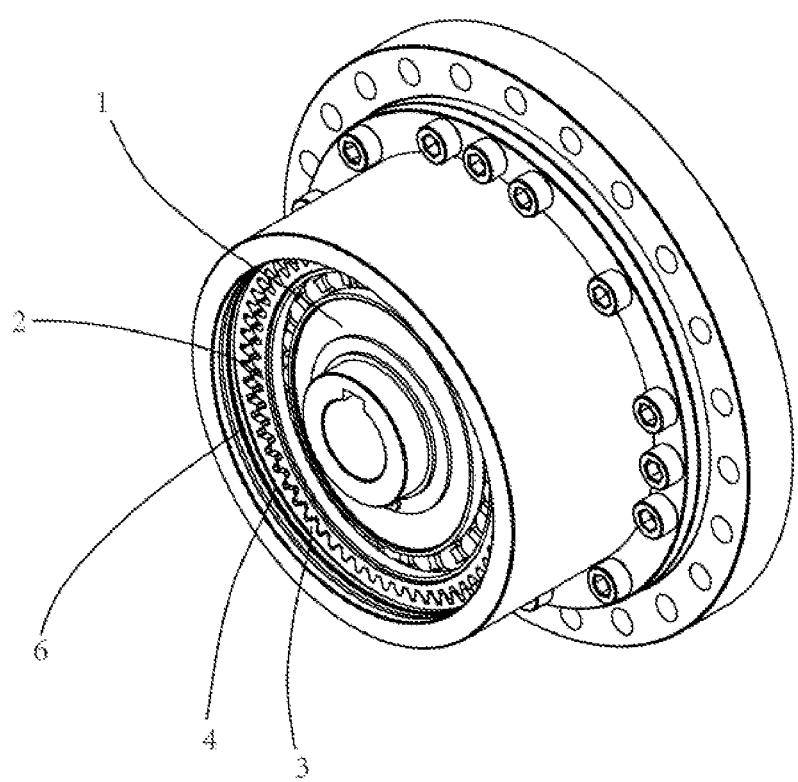
FIG. 15 is a stereogram of the double-flexspline harmonic reducer of the present invention according to embodiment 4.
Figure 16:
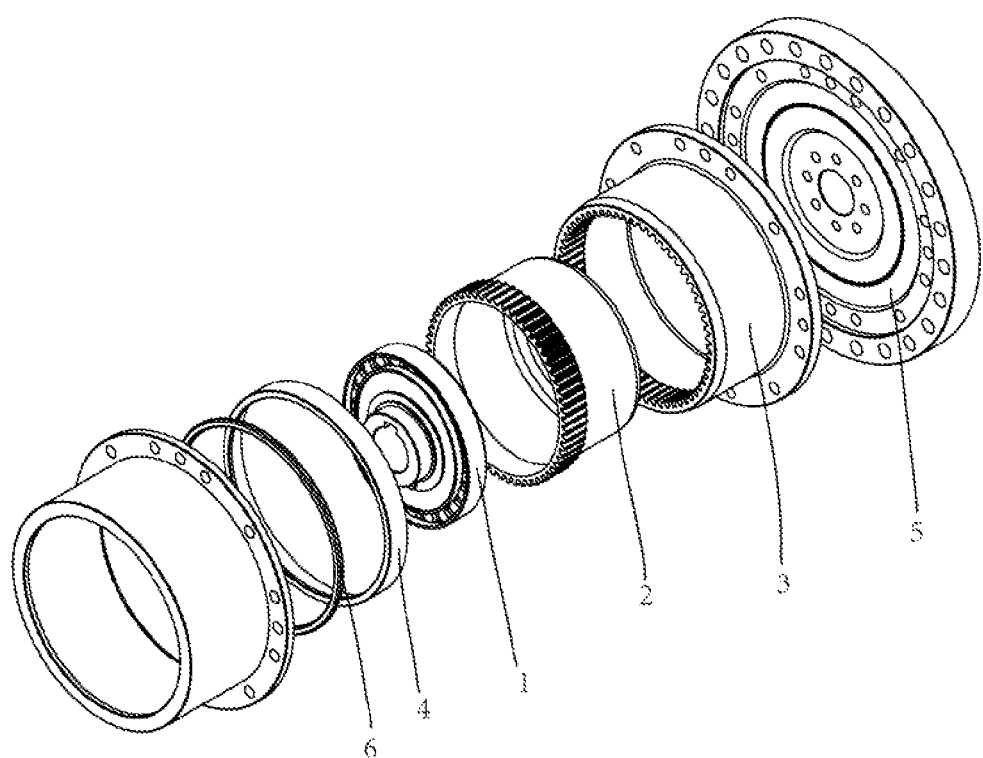
FIG. 16 is an exploded view of the parts of the double-flexspline harmonic reducer of the present invention according to embodiment 4.

Embodiment 4: as shown in FIGS. 13-16, a double-flexspline harmonic reducer comprises a strong flexspline, a weak flexspline, a wave generator, a deformation stopper of the strong flexspline, an elastic element and a main bearing; the main bearing is a cross roller bearing, the strong flexspline and the weak flexspline are arranged with a flange, respectively; the strong flexspline and the weak flexspline are fixed with the inner ring and outer ring of the main bearing via bolts, respectively; and the strong flexspline and the weak flexspline are all processed by using the existing processing technology and are made of commonly used steel for the flexsplines. The strong flexspline and the weak flexspline are respectively provided with teeth that can engage with each other; the weak flexspline is equipped with external teeth, and the strong flexspline is equipped with internal teeth, and the teeth is involute teeth; the shape of the weak flexspline is a thin-walled cup shape like most of the flexspline in the existing harmonic reducer, and the strong flexspline has an outer flange tubular shape, and the wall thickness of the strong flexspline is greater than 2.5 times the wall thickness of the weak flexspline; the number of teeth of the strong flexspline is 2 more than that of the weak flexspline; the wave generator uses an elliptical cam and a rolling bearing being arranged on the outer ring of the cam like the existing harmonic reducer; a shaft hole for inputting the power source is provided on the wave generator; and the wave generator is equipped in the weak flexspline so that the weak flexspline undergoes non-circular elastic deformation and engages with part of the strong flexspline; after the weak flexspline of the double-flexspline harmonic reducer undergoes the non-circular deformation under the action of the wave generator, the reference radius of the tooth of the elliptical long axis is larger than the reference radius of the teeth of the strong flexspline 0.1 mm, the contact part of the strong flexspline and the weak flexspline is subjected to the radial pressure of the weak flexspline to generate a non-circular elastic deformation; the deformation stopper is made of copper with high-hardness by machining, and the deformation stopper has a ring shape; and the elastic element is elastic pad with a steel frame rubber pad. The harmonic reducer of the present invention further comprises a connecting element with an inward flange, the elastic element is equipped between the inner flange of the connecting element and the deformation stopper, and the elastic element is installed in a compressed manner, so that the elastic element always has an expansion force along the axial direction on the deformation stopper. Under the push force of the elastic element, the deformation stopper continuously keeps in contact with the strong flexspline; the connecting element is provided with flange, and the flange is provided with bolt holes corresponding to the bolt holes on the strong flexspline, so that the flange of the connecting element and the flange of the strong flexspline are fixed to the outer ring of a same bearing by bolts. The lower edge of the outer wall of the strong flexspline is provided with a chamfered surface with an angle of 10 degrees, the inner wall of the deformation stopper is provided with a chamfered surface with an angle of 10 degrees; when the strong flexspline and the deformation stopper are fixed, the radial distance between the two chamfered surface is 0.1 mm. When the weak flexspline and the wave generator are assembled with the strong flexspline, the strong flexspline undergoes elliptical deformation, and the two chamfered surfaces of the elliptical long axis with an angle of 10 degrees kept in contact with the chamfered surface of the deformation stopper with an angle of 10 degrees. The weak flexspline always keeps part of the teeth continuously engaged in and out of the teeth of the strong flexspline along with the rotation direction of the wave generator, thus the wave generator rotating to drive the strong flexspline and the weak flexspline to rotate relative to each other, so as to achieve decelerating and increasing the torque. The strong flexspline shown in the figures has small deformation, which is not easy to visually see the elliptical deformation of the strong flexspline, so please understand the fact that the strong flexspline has deformation according to the description; the parts of the reducer, such as wave generator, bearing, are multi-entity parts, and the reference signs in the figures refer to any part of the entity contained in the reference signs; some connecting bolts and pads are hidden in the exploded view.

INDUSTRIAL APPLICABILITY

Harmonic reducer is an important part of precision rotation in the industrial field, especially in the field of multi-joint robots. The technical solution proposed by the present invention can realize a more precise or lower-cost harmonic reducer, which can replace traditional harmonic reducers and can be used in the field of industrial precision transmission and multi-joint robots.

What is claimed is:

1. A double-flexspline harmonic reducer, comprising a strong flexspline, a weak flexspline, a wave generator, and a deformation stopper of the strong flexspline;
    the strong flexspline and the weak flexspline are coaxially fixed axially and radially, the strong flexspline and the weak flexspline are respectively provided with teeth that can engage with each other; the number of teeth of the strong flexspline and the weak flexspline are different;
    the wave generator is used to make the weak flexspline to undergo non-circular elastic deformation and partially engage with the strong flexspline;
    the contact part of the strong flexspline and the weak flexspline is subjected to the radial pressure of the weak flexspline to generate a non-circular elastic deformation, a flexible tubular wall of the strong flexspline has a toothless surface, and a limiting contact surface is processed on the toothless surface, and the deformation stopper of the strong flexspline is relatively fixed with the strong flexspline;

the deformation stopper of the strong flexspline is processed with an annular limiting surface, and the limiting contact surface, located at the non-circular elastic deformation region where the strong flexspline is subjected to the radial pressure of the weak flexspline, is contacted with the annular limiting surface, and the deformation of the strong flexspline is limited due to the contact between the strong flexspline after deformation the deformation stopper.

2. The double-flexspline harmonic reducer according to claim 1, wherein the annular limiting surface is the annular limiting surface with a gradually changing diameter.

3. The double-flexspline harmonic reducer according to claim 2, wherein the diameter of the deformation stopper is different with that of the annular limiting surface of the strong flexspline by adjusting axial position of the deformation stopper relative to the strong flexspline, so as to adjust the deformation limiting value of the strong flexspline.

4. The double-flexspline harmonic reducer according to claim 3, wherein the deformation stopper of the strong flexspline is axially fixed to the strong flexspline directly through threads or indirectly through other elements of the reducer, and the deformation stopper and the strong flexspline realize axial position adjustment through relative rotation by the threads.

5. The double-flexspline harmonic reducer according to claim 4, wherein the fixing of the deformation stopper and the strong flexspline via threads further includes a thread-locking mechanism, the thread-locking mechanism is a top thread or a spline.

6. The double-flexspline harmonic reducer according to claim 4, wherein a gear is provided on the deformation stopper of the strong flexspline, an external element may push the gear via other gears or worm so as to rotate the deformation stopper, and the external element may further lock the gear on the deformation stopper by adopting a non-rotating gear or worm so as to realize the locking of the fixed position of the deformation stopper along the axial direction of the strong flexspline relative to the strong flexspline.

7. The double-flexspline harmonic reducer according to claim 1, wherein the double-flexspline harmonic reducer further comprises an elastic element used for applying axial force to the deformation stopper, and the deformation stopper can move axially under the force of the elastic element.

8. The double-flexspline harmonic reducer according to claim 1, wherein the deformation stopper of the strong flexspline can be processed into a flexspline protective housing or a part of the flexspline protective housing.

9. The double-flexspline harmonic reducer according to claim 1, wherein the double-flexspline harmonic reducer further comprises a connecting element which is relatively fixed to the strong flexspline, and the deformation stopper is fixedly connected to the connecting element to realize the relative fixing between the connecting element and the strong flexspline.

10. The double-flexspline harmonic reducer according to claim 6, wherein the double-flexspline harmonic reducer further comprises a gear or worm, the gear or the worm and the gear processed on the deformation stopper form a gear transmission pair or a worm helical gear transmission pair, and the rotation axis of the gear/worm is relatively fixed to the strong flexspline.

* * * * *